Feb. 2, 1932.   G. E. SMITH   1,843,744
STEERING WHEEL
Filed Dec. 29, 1922   2 Sheets-Sheet 1
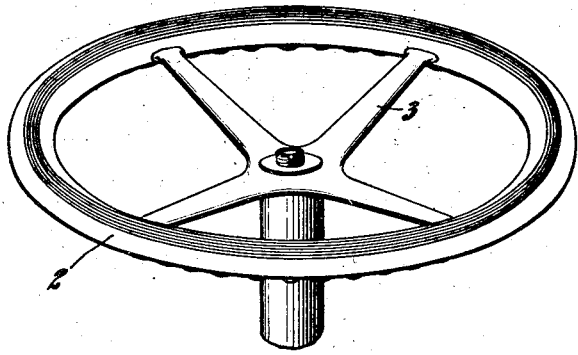
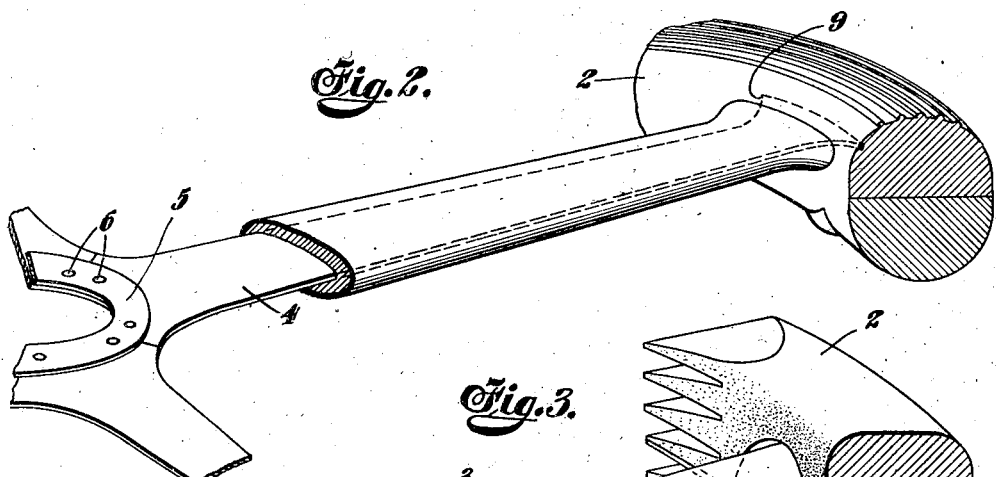
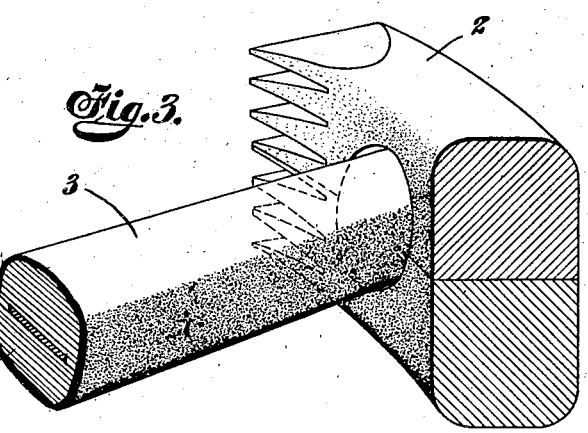
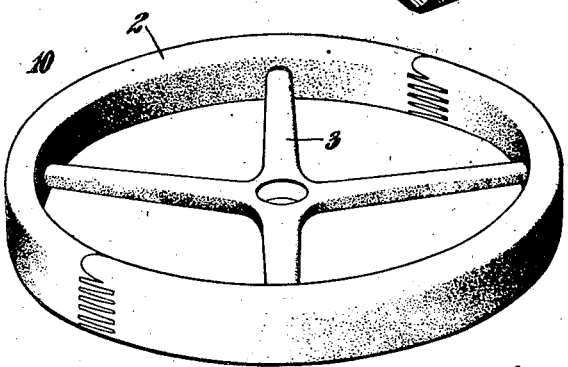
Inventor
Grant E. Smith
By his Attorneys
Emery Booth Janney & Varney Feb. 2, 1932.  G. E. SMITH  1,843,744
STEERING WHEEL
Filed Dec. 29, 1922  2 Sheets-Sheet 2
Fig. 5.
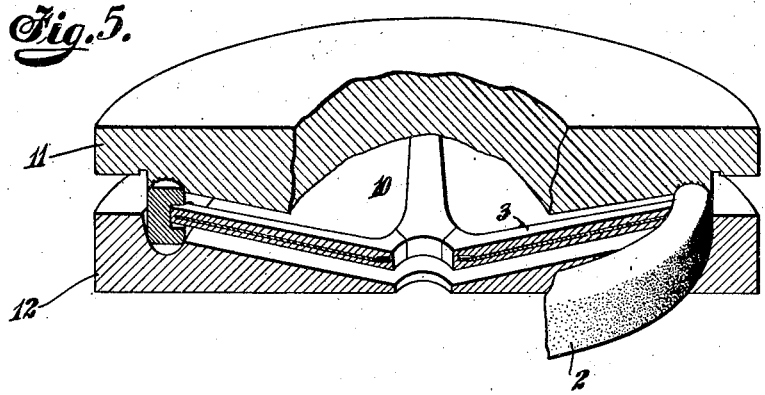
Fig. 6.
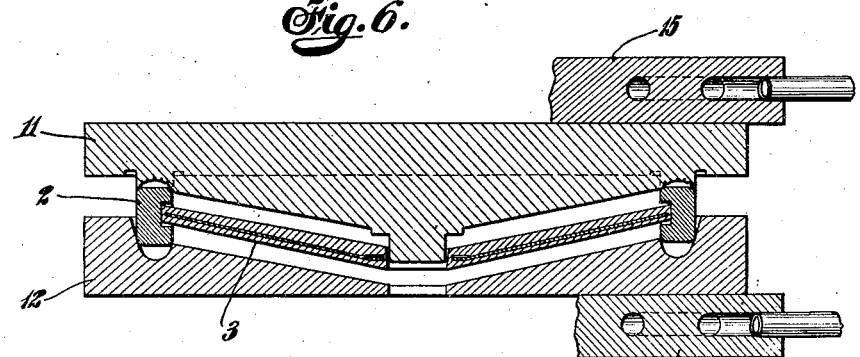
Fig. 7.
Fig. 8.
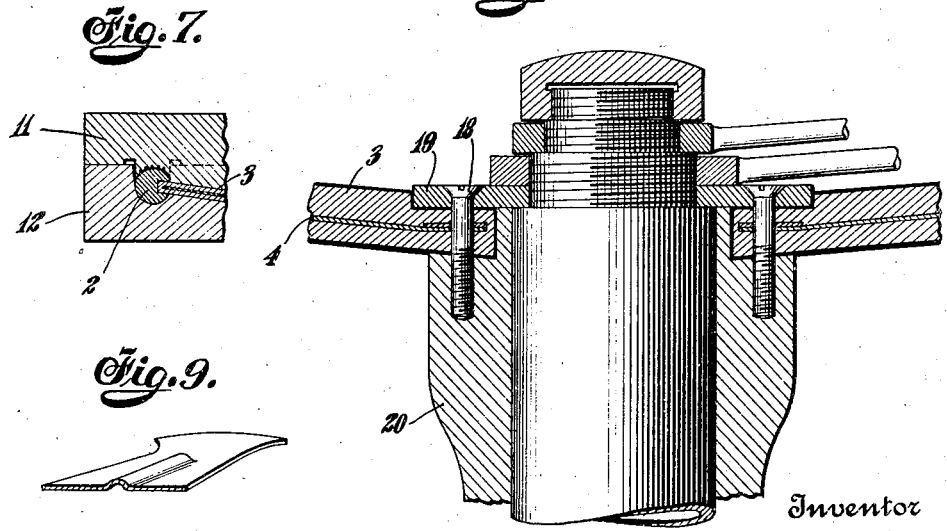
Fig. 9.
Inventor
Grant E. Smith
By his Attorneys
Emery Booth, Janney & Varney Patented Feb. 2, 1932

1,843,744

UNITED STATES PATENT OFFICE

GRANT E. SMITH, OF POUGHKEEPSIE, NEW YORK, ASSIGNOR TO POUVAILSMITH CORPORATION, OF POUGHKEEPSIE, NEW YORK, A CORPORATION OF NEW YORK

STEERING WHEEL

Application filed December 29, 1922. Serial No. 609,557.

The invention relates to improvements in wheels, and to the manufacture thereof; the object of the invention being to provide a strong, durable and attractive wheel and to provide an economical and expeditious method of manufacturing the same. Inasmuch as the invention has been developed in connection with the manufacture of steering wheels for automobiles such an embodiment of the invention has been selected for illustration and description herein.

Steering wheels as commonly manufactured have a heavy rigid metal spider to which a wooden rim is secured. There is now a growing demand for a steering wheel in which the metal spider is replaced by a more attractive structure which will better harmonize with the rim and which will not feel hot or cold in the hand as the metal spider does during extremes of weather.

It has been proposed to make the spokes of the steering wheel of wood thus providing a spoke of the same character as the rim but certain difficulties are encountered in the processes of manufacture of such wheels.

The present invention provides a novel wheel wherein the rim is constructed of wood or other suitable material and the spokes are fabricated from fibrous or other suitable material preferably reinforced with metal or other suitable material. The spokes are made of such size as to present a pleasing appearance and to be comfortably grasped by the hand. The wheel of the present invention when reinforced with metal is preferable to a wheel having wooden spokes for the reason that in the event of an accident in which the wheel is broken, the manner of breaking is such that dangerous jagged ends are not presented to the driver as is likely to occur in the case of wooden spoked steering wheels.

The invention provides also a novel method of manufacture whereby the steering wheel may be economically and expeditiously molded from a blank which need not be accurately pre-formed before it is introduced into the mold in which it is finally formed and cured. Wheels made in accordance with the invention will not appreciably warp or shrink and are hard, durable and water proof. The nature and objects of the invention will be better understood from a description of an illustrative embodiment thereof.

In the accompanying drawings forming a part hereof,

Figure 1 is a perspective view of an automobile steering wheel made in accordance with the invention.

Figure 2 is a perspective view, partly in section, of a portion of the steering wheel rim and spoke showing particularly the construction of the spoke and the reinforcement therein.

Figure 3 is a perspective view, partly in section, of a portion of a blank from which the wheel illustrated is made, showing the shape and relative size of the parts before the pressing and molding operation.

Figure 4 is a perspective view showing the sections assembled to form the blank and ready to be compressed and molded to form the steering wheel shown in Figure 1.

Figure 5 is a perspective view, partly in section, and somewhat diagrammatic in character, illustrating a suitable mold equipment which may be used in carrying out the method of manufacture, showing the assembled parts in the mold and the mold in partly closed position ready for the compressing and molding operation.

Figure 6 is a sectional view of the mold with the blank therein.

Figure 7 is a sectional view of a portion of the mold similar to Figure 6 but showing the blank in the mold after the mold has closed to form the wheel.

Figure 8 is a sectional view showing the spider of the wheel and the means for securing it to the steering shaft.

Fig. 9 is a view showing a modified form of reinforcement.

In the wheel shown the rim 2 is of wood or other fibrous material compressed and molded to shape and size from a partially shaped blank of substantially larger size as seen in Figures 3 and 4. The spider comprising the spokes 3 is compressed and molded from a partially preformed blank consisting of fibrous material such for example as wood, paper, fiberboard or other suitable material.

The spider may be provided with any desired reinforcement. As shown, the spider arms or spokes are centrally reinforced with sheet metal strips 4, the inner ends of which are secured to an annular hub reinforcing ring 5 as for example by spot welding as indicated at 6 in Figure 2. The unitary metal structure constitutes a reinforcing spider having hub and spoke parts.

The preferred method of making the wheel shown involves applying a suitable coating to previously prepared preliminarily shaped and assembled blank sections and molding the same to form the finished wheel. The preliminary treatment of the blank to form the same and prepare it for the molding operation may vary considerably. As shown, the rim blank is formed from pieces of wood by steaming and bending, the several pieces being assembled to form a complete rim. The spider blank may conveniently be formed by assembling laminæ of paper 7 of suitable quality, as for example spongy paper made from wood pulp and of a thickness of, for example, $\frac{1}{32}$ or $\frac{1}{16}$ of an inch, with or without the reinforcement 4, 5 for the spokes and hub portions. The blank should be substantially thicker than the finished spider and may be for example twice as thick. It is not essential that the molded spokes meet to form a hub as obviously the inner ends of the spokes may be received in a metal hub structure if preferred. The reinforcement may be of any desired character. If sheet metal is used it may be formed with a longitudinal rib to increase its strength as indicated in section in Figure 9 if desired. The outer end of each spoke is inserted in a suitable recess in the rim, the end of the reinforcement preferably being so formed as to provide an anchoring engagement with the rim. As shown the outer ends are laterally extended as indicated at 9 in Figure 2. The blank is provided with a coating of suitable material such for example as a phenolic condensation product or resinous material. The coating material preferably is of such a character that during the molding operation and without separate treatment, it will become cured to form a permanent hard wear-resisting surface.

A suitable phenolic condensation product such as those sold under the trade names "bakelite" and "condensite" mixed with a suitable solvent such as methyl alcohol may be satisfactorily used.

I find it convenient to make the solution of a consistency similar to that of varnish and to apply the same to the sections by dipping them in the solution and allowing them to dry. If an insufficient amount of the coating is applied to the sections by one dipping operation, they may be re-dipped or a similar material in dry powdered form may be added by dusting on after the first dipping operation and while the solution is still wet or tacky. The coating may be forced into the blank sections under pressure instead of being merely superficially applied by dipping or the like. If desired, the sections may be roughened to facilitate adherence of the coating but ordinarily this is not necessary. Whatever way the coating is applied the coated blank will have a rough appearance as indicated by stippling in Figures 3 and 4.

The coating may be applied either to the spider as a whole or to the separate laminæ thereof as may be desired.

The assembled blank, the parts of which are coated and dried as above indicated, is compressed and molded to form the finished wheel, the rim sections being compressed about the extremities of the spider or spokes to firmly lock the same together. Preferably the compressing and molding operation is performed while the blank is maintained in heated condition and the compressed blank is then cooled while still under pressure.

In the method selected for more specific description, the complete blank 10 is placed in the previously heated two-part mold 11, 12 and the mold is placed in a press between heated pressure heads 15, 16. After the blank has been arranged in the mold, I prefer to add additional adhesive for example in the form of dry powder, especially at the joints in order to fill in all crevices and to make a stronger and better joint. The amount of adhesive added to the body of the spider and to the rim will depend upon the character of wheel desired and whether a substantial thickness of the adhesive is desired throughout the body of the structure. If a considerable thickness of the adhesive is desired in the finished wheel, the adhesive may be added in the form of molded blanks of predetermined thickness. The pressure heads of the press are then brought against the mold parts to press the same against the blank with a light pressure. The mold is allowed to absorb heat from the pressure heads and the blank to absorb heat from the mold for a predetermined time, for example, for five minutes, until the blank becomes thoroughly heated and then the extreme pressure is applied to close the mold and compress the rim blank to form the finished rim 2 as shown in Figure 7. When the mold is closed and the blank fully compressed, it is cooled while still maintaining the pressure or a part of the pressure. During the pressing and molding operation the wood and the paper, or other fibrous material, will flow to conform to the shape of the mold, that is to say, the fibers of the wood of the rim will move relatively and adjust themselves to the conformation of the mold in which the blank is compressed and particularly to fit tightly around the ends of the spider arms.

The heat of the mold first softens and makes plastic the coating and then during the compressing operation a part of the coating is forced into the pores of the wood of the rim and into the body of the fibrous material and simultaneously cured to form a hard wear-resisting surface. The coating also acts as a lubricant between the mold and the blank.

The pressure employed may range for example from 500 to 5000 pounds per square inch of the blank to be compressed, depending upon the amount of compression desired, the material compressed, the size of the desired resulting article, and other particular features characteristic of the material, finish or mold. The temperature at which the operation is performed may vary considerably. Successful results have been obtained by compressing a wood and reinforced paper blank at temperatures which approach 300° F. I find it convenient to heat the pressure heads by steam under a pressure of about 85 pounds per square inch, circulating in suitable passages 20 therein. The molds may be cooled when the compressing operation is completed by circulating water in these same passages. The preliminary heating of the molds prior to the insertion of the blank may be accomplished in any suitable way. I find it convenient to provide steam tables heated by steam at about 85 pounds pressure on which the molds are heated before the blank is inserted.

It is one of the disadvantages of wooden wheels as commonly constructed that it is difficult to firmly secure the same to a steering post. Where devices involving bolts extending through the wood of the wheel are employed the wood yields under the strain of use and as the holes become enlarged the wheel becomes loose. In the construction shown the metal reinforcement comprising the central ring together with the spoke reinforcements overlapping the ring and secured thereto provide a metal bearing for bolts 18 which extend through the wheel parallel to its axis and which secure together the clamping ring 19 and steering post 20 with the wheel therebetween. If clamping plates are applied to the top and bottom of the wheel with or without a central sleeve, bolts similar to the bolts 18 will similarly engage the metal reinforcement and provide a rigid structure.

The invention provides an exceptionally strong fabricated structure by reason of the compressing and molding which increases the density of the materials and increases the coordination of the fibres. By the term "fabricated structure" is implied, one built up of several parts connected with one another to form a complete structure. The operation of pressing the paper or other fibrous material and combining the phenolic condensation product or other equivalent material with the surface thereof, produces an article which will not appreciably warp nor shrink but molds to a permanent set condition and has a low coefficient of expansion.

Certain features of the process will be better understood by reference to the copending application for molded article and method of making the same, Patent #1,680,646, dated August 14th, 1928.

The foregoing description of a particular embodiment is illustrative merely and does not define the limits of the invention.

Claims:

1. A molded wheel formed of spoke sections comprising layers of paper assembled and coated with a phenolic condensation product and rim sections of wood coated with a phenolic condensation product and assembled in interlocking relation with said spider, the spider and rim being reshaped under heat and pressure to form a wheel and to cure the phenolic condensation product.

2. A steering wheel combining a rim of wood and spokes of laminated fibrous material reinforced by metal molded to one another.

3. A molded wheel formed of rim sections of wood separately coated with adhesive, spokes of fibrous material coated with adhesive and metal reinforcement embedded therein, all assembled in interlocking relation and re-shaped under pressure.

4. A steering wheel combining a rim of wood and spokes of laminated fibrous material molded to one another.

5. A steering wheel combining rim sections of wood and a spider comprising laminated paper separately coated and molded the one into the other under heat and pressure to form the wheel and cure the coating.

6. In a fabricated wheel the combination with spokes comprising sheet metal and sheet fibrous material assembled therewith of rim sections having recesses into which the spokes project, the whole being compressed under heat and pressure to mold the rim and spokes together.

7. A steering wheel having a reinforcing spider formed of sheet metal, and paper sections enclosing said spider assembled and compressed.

8. A molded wheel of the character described comprising a rim formed of compressed wood and a spider formed of compressed fibrous material having a reinforcement of metal with hub members engaging the hub portion of the wheel and bolts clamping said hub portion to the wheel hub and engaging the metal reinforcement.

9. A steering wheel combining a spider of molded fibrous material having metal reinforcement embedded therein, clamping plates engaging said spider at its center portion and clamping bolts securing said clamping plates together and engaging holes in the metal reinforcement.

10. A spider for wheels comprising an annular sheet metal ring and sheet metal spokes secured thereto, together with fibrous material surrounding said annular ring and spokes, said fibrous material being coated with a phenolic condensation product and molded and compressed under heat and pressure to cure the adhesive and to mold the fibrous material.

11. A spider for wheels comprising a sheet metal reinforcing spider and laminæ of paper surrounding and enclosing said spider, and an exterior coating of a phenolic condensation product, the whole being molded and compressed under heat and pressure to cure the adhesive and mold the adhesive and paper.

12. The method of forming a fabricated wheel which comprises assembling a sheet metal reinforcing spider and laminated fibrous material to form a spider and assembling therewith a mortised wooden rim with the extremities of the spider projecting into the mortises of the rim, and molding the same under heat and pressure to form the wheel.

13. The method of making a steering wheel comprising wooden rim sections and reinforced fibrous spoke sections which comprises assembling paper spoke sections with a metal reinforcement and assembling the wood rim sections therewith with the ends of the spoke sections projecting into recesses in the rim sections and compressing the whole to mold the rim and spoke sections together and cure the adhesive.

14. The method of making a steering wheel which comprises assembling paper spider sections and wood rim sections with the extremities of the spider sections projecting into recesses in the rim sections and compressing and re-shaping simultaneously the rim and spider sections while molding the two together and securing the arms of the spider to the rim.

15. The method of making a steering wheel having a wooden rim and fibrous spider sections reinforced with metal which comprises applying synthetic resin to a plurality of rim and spider sections, assembling the sections with the spider arms fitting into the rim, molding the assembled sections with heat and pressure, the synthetic resin of adjoining faces of the sections uniting the same to each other and the synthetic resin on the outer faces of the sections, forming a hard, waterproof surface for the wheel.

16. The method of making a steering wheel which comprises coating a plurality of sections of wood and of paper with an adhesive, assembling the sections to form a rim and spider in a mold with the spider arms extending into the rim and closing the mold to condense the sections and shape the same to form the wheel, the sections of the rim and of the spider being compressed to about one half their original volume and being molded together in interlocking relation.

17. The method of making a steering wheel which comprises assembling paper spider sections and wooden rim sections to form a wheel blank, heating the blank to a temperature at which the wood and paper become moldable, compressing the blank to about one half its ordinary volume to mold the same to form a wheel and cooling the molded wheel under pressure.

18. The method of making a steering wheel which comprises assembling paper spider sections and wooden rim sections to form a wheel blank, applying a curable coating to the blank, heating the blank to a temperature at which the wood and paper become moldable, compressing the blank to about one half its ordinary volume to mold the same to form a wheel and cooling the molded wheel under pressure.

19. The method of forming a wheel which comprises applying to a metal reinforced paper spider blank, and to wood block rim sections, a coating normally plastic at high temperatures and adapted to solidify on curing, assembling the same to form a wheel with the spider extremities engaging into the rim, heating the assembled structure, compressing the same to substantially reduce the size thereof and to cause flowing of the wood and fibrous material while maintaining the structure at high temperature, and thereafter allowing the blank and coating to cool under pressure.

20. A steering wheel combining a spider of molded fibrous material having metal reinforcement embedded therein, clamping plates engaging the molded material of said spider at its central portion, and clamping bolts securing said clamping plates together and engaging holes in the metal reinforcement, said clamping plates engaging into the fibrous material.

21. A steering wheel comprising a hub formed of moldable metal reinforced material the metal reinforcement being formed with an annular series of holes registering with holes in the molded material for securing the wheel to a steering post.

22. A fabricated wheel comprising a hub, said hub comprising fibrous material combined with a condensation product and metal reinforcement, the fibrous material and condensation product being molded about the metal reinforcement to form a reinforced rigid hub.

In testimony whereof, I have signed my name to this specification this 28th day of December, 1922.

GRANT E. SMITH.